(12) United States Patent
Cazzani

(10) Patent No.: US 11,459,119 B2
(45) Date of Patent: Oct. 4, 2022

(54) INSTALLATION AND METHOD FOR CONTROLLING SIGNALLING LIGHTS ARRANGED IN SERIES

(71) Applicant: Umberto Cazzani, Correzzana (IT)

(72) Inventor: Umberto Cazzani, Correzzana (IT)

(*) Notice: Subject to any disclaimer, the term of this patent is extended or adjusted under 35 U.S.C. 154(b) by 82 days.

(21) Appl. No.: 16/980,066

(22) PCT Filed: Mar. 18, 2019

(86) PCT No.: PCT/IB2019/052163
§ 371 (c)(1),
(2) Date: Sep. 11, 2020

(87) PCT Pub. No.: WO2019/180574
PCT Pub. Date: Sep. 26, 2019

(65) Prior Publication Data
US 2021/0024225 A1    Jan. 28, 2021

(30) Foreign Application Priority Data
Mar. 19, 2018   (IT) .................. 102018000003738

(51) Int. Cl.
*B64F 1/20*   (2006.01)
*H05B 47/155*   (2020.01)
*H05B 47/18*   (2020.01)
*H05B 47/165*   (2020.01)

(52) U.S. Cl.
CPC ............ *B64F 1/20* (2013.01); *H05B 47/155* (2020.01); *H05B 47/165* (2020.01); *H05B 47/18* (2020.01)

(58) Field of Classification Search
CPC .......... B64F 1/20; B64F 1/205; H05B 47/155; H05B 47/165; H05B 47/18; H05B 47/23; B64D 2203/00
See application file for complete search history.

(56) References Cited

U.S. PATENT DOCUMENTS

| | | | | |
|---|---|---|---|---|
| 5,926,115 A | * | 7/1999 | Schleder | H05B 47/235 315/130 |
| 6,489,733 B1 | * | 12/2002 | Schmidt | B64F 1/205 315/320 |
| 2005/0190078 A1 | * | 9/2005 | Salter | H05B 47/22 340/945 |

OTHER PUBLICATIONS

Bete et al, English Translation of DE 10144929 A1, Published Apr. 30, 2003, pp. 1-9 (Year: 2003).*

* cited by examiner

*Primary Examiner* — Daniel D Chang

(57) ABSTRACT

An installation powers and controls a plurality of signaling lights arranged in series, each having at least one light source. The installation includes a unit with a primary power supply situated upstream for remotely programming or managing operation of the installation; a primary series circuit with a transformer for each signaling light; a control module for each signaling light; a secondary power supply circuit for powering the control modules, independent of the primary circuit; a first optical cable for bi-directionally connecting a first upstream module to the programming or managing unit; and a second optical cable for bi-directionally connecting a last downstream control module to the programming/management unit, with each control module being connected in series to an adjacent upstream module and to an adjacent downstream module by means of a respective bi-directional optical connection.

20 Claims, 7 Drawing Sheets

INSTALLATION AND METHOD FOR CONTROLLING SIGNALLING LIGHTS ARRANGED IN SERIES

CROSS-REFERENCE TO RELATED APPLICATIONS

The present invention is a U.S. National Stage entry of international patent application no. PCT/IB2019/052163, filed on Mar. 18, 2019, which claims priority to Italian patent application no. 102018000003738, filed on Mar. 19, 2018.

STATEMENT REGARDING FEDERALLY SPONSORED RESEARCH

Not applicable.

PARTIES TO A JOINT RESEARCH AGREEMENT

Not applicable.

SEQUENCE LISTING

Not applicable.

STATEMENT REGARDING PRIOR DISCLOSURE

Not applicable.

BACKGROUND OF THE INVENTION

The present invention relates to an installation and a method for controlling signalling lights arranged in series, in particular airport runway lights.

It is known, in the technical sector of aeronautics, the need to provide signalling lights along the taxiing and take-off/landing runways of airports; it is also known that said lights are installed both in longitudinal rows arranged along the edges and in the centre of the runway, parallel thereto, and in rows arranged transversely with respect to the runway at a predefined distance from each other (stop bars).

The longitudinal rows mark out the travel path for the aircraft, guiding it during take-off/landing, while the transverse rows regulate the advancing movement/stopping of the aircraft which are simultaneously present on the same runway, in order to prevent accidents.

For all the types of lights, the regulations lay down very strict standards with regard to:
- the minimum number of adjacent lights which must always be lit;
- the maximum time periods allowed for detecting any faults (i.e. lights which are not lit);
- the precise identification of which lights are not lit;

Wherein compliance with these standards defines the category of the airport. A first long-standing solution proposed for monitoring these lights involves a carrier-wave transmission module which transmits data and draws on the power supply for its operation, using a primary power supply cable for the runway lights; this module is arranged between each power supply branch-off transformer and the said light.

Although advantageous since it avoids modification of the existing circuits, the solution has, however, a number of drawbacks since:

- it requires a high level (51 MΩ) of ground isolation of the primary power supply cable in order to allow correct operation of the carrier-wave transmission, said waves travelling at 100 KHz;
- it increases significantly the electric power consumption owing to the high number of additional modules introduced, this resulting in a large amount of wasted energy since it is required to increase the power needed from the start of the circuit; in fact these additional modules which are introduced require a power consumption equivalent to that of the lamp being controlled, and therefore the pre-existing CCR (constant current regulator) which powers the lamp must be replaced with a regulator which is able to deliver twice the amount of power;
- it is possible to transmit only up to a speed of 30 Kb/s, which makes it difficult to comply with the short detection time intervals (2 seconds) required by the current safety standards.

Further prior art is known from DE 101 44 429 A1 which describes an installation for controlling the switching on and switching off of a plurality of signalling lights arranged in series, comprising a unit for managing operation of the installation, with a primary upstream power supply; a primary series circuit for powering the lights, comprising a transformer for each light, the transformers being connected in series to the primary power supply; and a module for controlling each light arranged between a respective transformer and the associated light. The control modules and the management unit are connected in parallel by means of an optical-fibre ring bus which provides a data connection independent of the primary power supply series circuit. Although the installation described in DE 101 44 429 is able to achieve a better connection speed and control of the single lights and allows the possibility to cope with breakage of a lamp of a light, its operation is compromised in the event of faults or malfunctions affecting the power supply circuit, any point along the optical-fibre ring bus or the communication interface between the latter and a single control module. It is also difficult to identify precisely the fault in order to carry out repair quickly and restore the operability of the landing runway.

BRIEF SUMMARY OF THE INVENTION

The technical problem which is posed therefore is that of providing an installation or a method for controlling the operating state and/or switching-on/switching off of the signalling lights of airport runways, which provides a solution to or at least reduces the aforementioned technical problems and is in particular designed to allow precise identification and localization of any faults along the line without need for on-site checks. A particularly desirable aspect is that the installation and the method should be able to cope with one or more faults which may affect the lights, the devices for controlling the lights or the connections with them or at the least ensure the at least partial operability of the signalling light installation in the event of faults of this type. It is also required that the installation should be able to allow a reduction in the response time needed to identify the fault, so as to ensure an optimum categorization of the airports.

In connection with this problem it is also required that this installation should have small dimensions, be easy and inexpensive to produce and assemble, should be able to be installed easily at any user location (airport) and should be able to ensure a lower power consumption compared to the prior art. With such an installation, in fact, a higher degree of reliability, in particular a better capacity to identify, overcome and/or withstand faults and malfunctions is achieved. In particular, it is ensured that: faults affecting the primary power supply for the lights do not affect either the power supply or communication with the control modules; faults affecting a single control module do not adversely affect the operability of all the other modules and may be identified and located with precision and without delay; faults affecting a single optical connection do not alter the operability of the lights arranged in series, said lights being able to be bypassed by means of the alternative optical channel for connecting the control modules to the management unit. Moreover, faults affecting the optical communication means of a single control module may generally also be resolved without adversely affecting the operability of the lighting system.

BRIEF DESCRIPTION OF THE SEVERAL VIEWS OF THE DRAWINGS

Further details may be obtained from the following description of a non-limiting example of embodiment of the subject of the present invention provided with reference to the attached drawings in which.

DETAILED DESCRIPTION OF THE INVENTION

Figure 1:
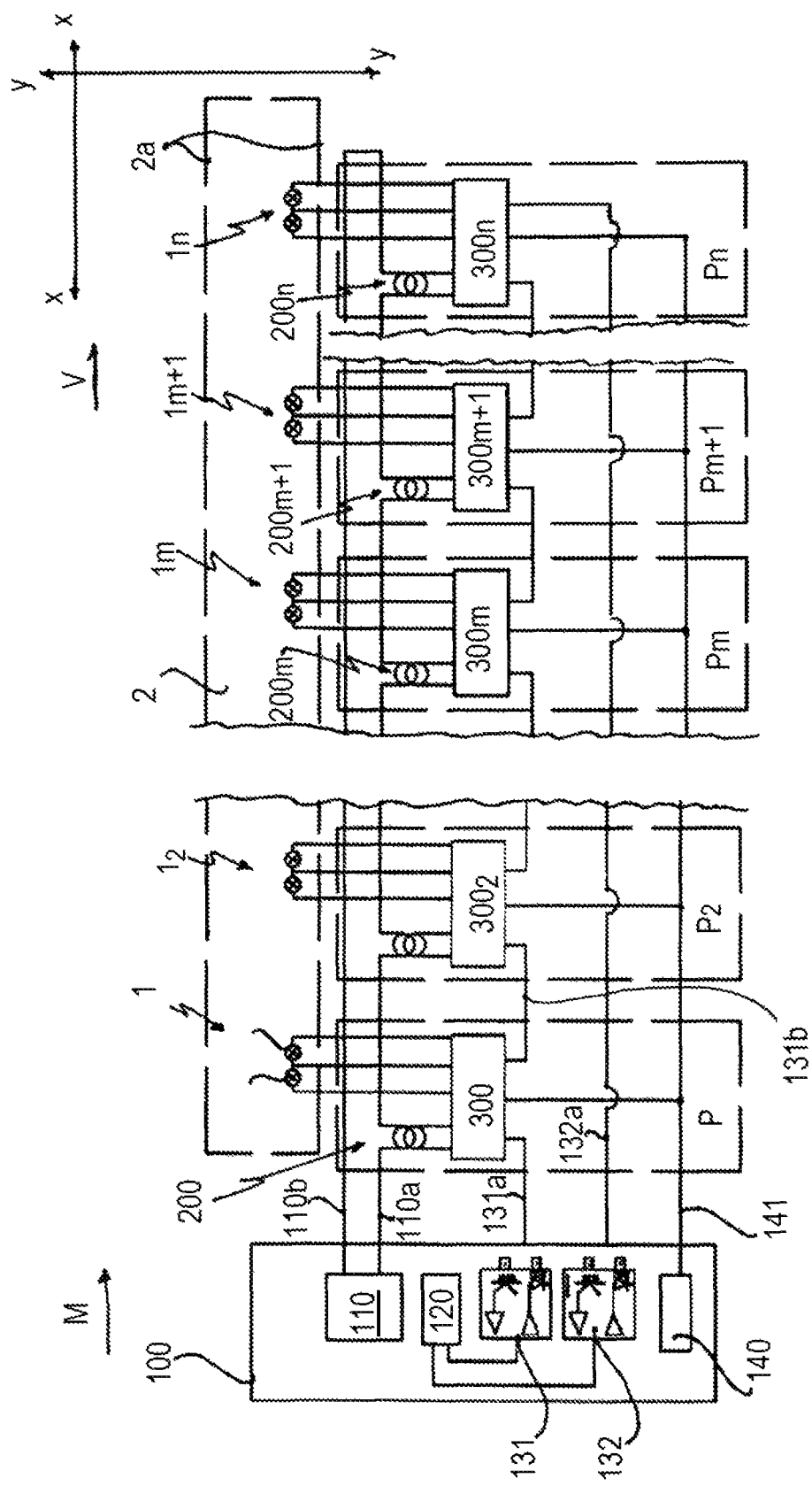
FIG. 1: shows a general block diagram of an assembly for lighting airport runways with a control installation according to the present invention.
Figure 2:
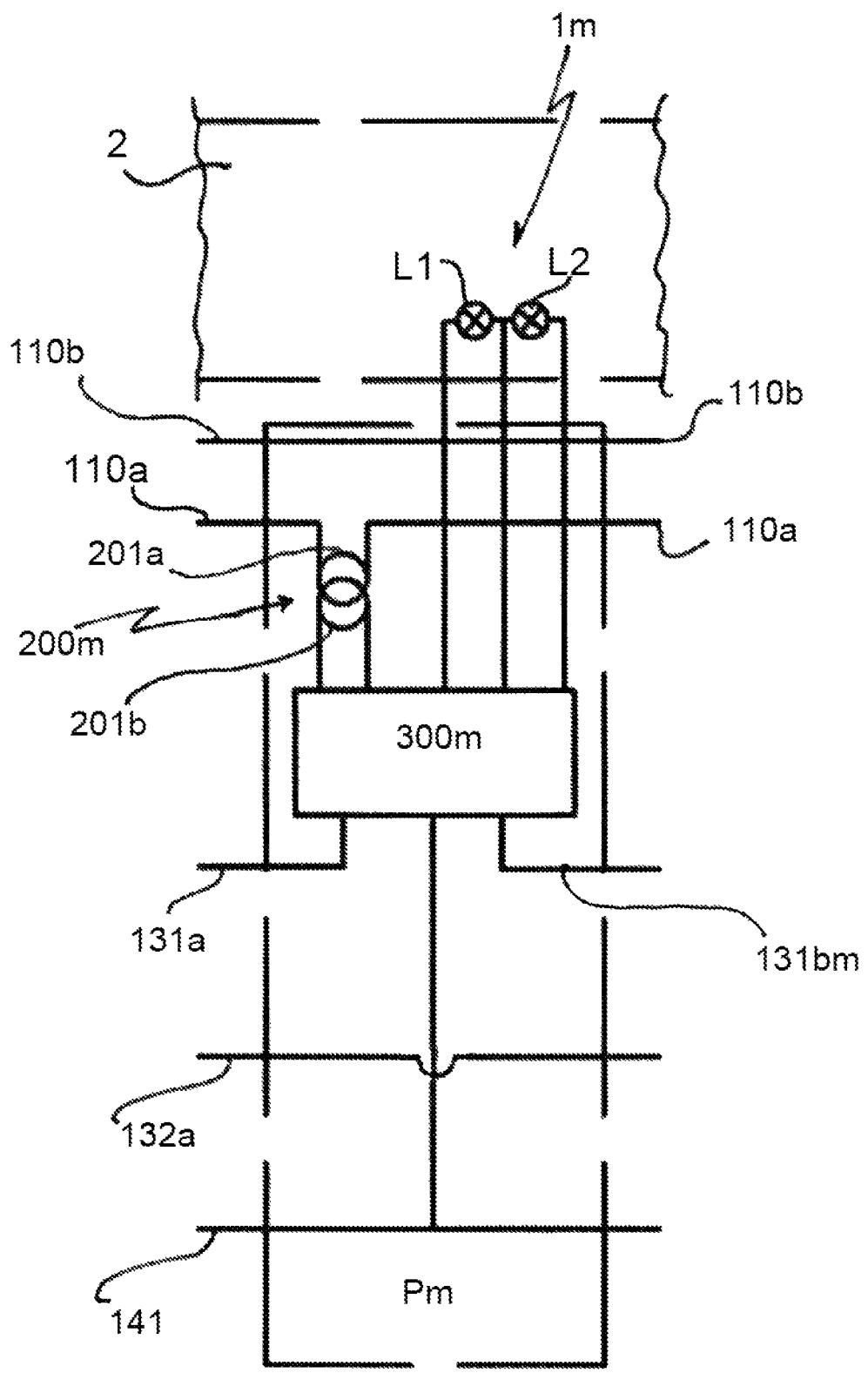
FIG. 2: shows an enlarged view of the detail of the connections to/from the control module forming part of the installation from/to the various components.

Assuming, as shown in FIG. 1, solely for easier description and without a limiting meaning, a pair of reference axes in a longitudinal direction X-X, parallel to the direction of longitudinal extension of an airport runway, and transverse direction Y-Y orthogonal to the aforementioned direction and corresponding to the widthwise direction of the said runway, as well as an upstream part M corresponding to the start of the electrical power supply flow and a downstream part V opposite to the upstream part, for the purposes of the description of the present invention only one row of lights 1, . . . , 1m, . . . 1m+1 . . . , 1n arranged along the edge 2a of an airport runway has been illustrated, but it is envisaged that the runway may comprise a plurality of rows of lights both parallel (as shown) and transverse (i.e. stop bars) to the said runway; in addition the example illustrated shows a preferred embodiment in which each light 1, . . . , 1m, . . . 1m+1 . . . , 1n comprises pairs of lamps L1,L2 connected in series, arranged parallel to the longitudinal direction X-X; however, other configurations are possible where each light comprises a single lamp or a plurality of lamps with longitudinal and/or transverse dimensions and/or combinations thereof; it is envisaged moreover that the lamps may consist for example of light bulbs or LEDs or similar suitable light sources.

Assuming the above, an example of a lighting assembly for an airport runway comprises: a plurality of lights 1, . . . , 1m, 1m+1, . . . , 1n arranged along the runway 2 of an airport and connected in series; the example described refers to a pair of lamps L1, L2 connected together in series for each light 1; and a preferred embodiment of an installation for powering and controlling the lights 1 of a runway according to the invention, which comprises:

a transformer 200, . . . , 200m, . . . , 200m+1, . . . , 200n for each light 1, . . . , 1m, . . . 1m+1 . . . , 1n; the primary winding 201a of the first transformer in the series being connected to an upstream primary electric power supply 110 and to the primary winding of the adjacent downstream transformer 200m.

Each successive transformer 200m is in turn connected to the primary winding of the adjacent upstream transformer 200m−1 and to the primary winding of the adjacent downstream transformer 200m+1, thus forming a chain of transformers which constitutes the series power supply circuit of the lights;

the primary winding of the last transformer 200n in the series is in turn connected to the primary winding of the adjacent upstream transformer 200n−1 and to the primary power supply 110 so as to close the series circuit. The secondary winding 201b of each transformer 200m is connected to a respective control module 300m described below;

a unit 100 for remotely programming/managing the operation of the installation, which comprises:
said primary power supply 110, preferably comprising a constant current regulator for generating and supplying the current/voltage for switching on the lights 1, comprising a branch 110a for powering the primary windings 201a of the transformers 200 in series and a branch 110a returning from the last transformer 200n and closing the series circuit;
a cabin processor 120, for example comprising memory devices and a CPU for programming and managing operation of the installation and remotely controlling the lights 1;
at least a first primary electro-optical conversion device 131 and a second primary electro-optical conversion device 132, each of which is designed to receive and convert an input optical signal into a digital signal compatible with the processor 120 and, vice versa, convert a digital signal into an output optical signal to be transmitted;
each primary conversion device 131,132 is connected to a respective first optical cable or second optical cable 131a, 132a for receiving/transmitting optical signals from/to modules 300 for controlling switching on/off of the lights 1. Each primary conversion device 131,132 therefore provides a respective transmitter-receiver pair for transmitting and receiving optical signals to/from the control modules 300;
a secondary power supplier 140, separate from the primary power supplier 110, for powering the control modules 300 by means of respective conductors 141.

According to the present invention it is envisaged that said installation further comprises (FIG. 1,2):

a control module 300, ..., 300*m*, ..., 300*m*+1, ..., 300*n* electrically arranged between each transformer 200 and the respective light 1; each module 300*m* and transformer 200*m* of a respective light 1*m* being, normally, inserted in a well Pm along the runway edge.

Figure 3:
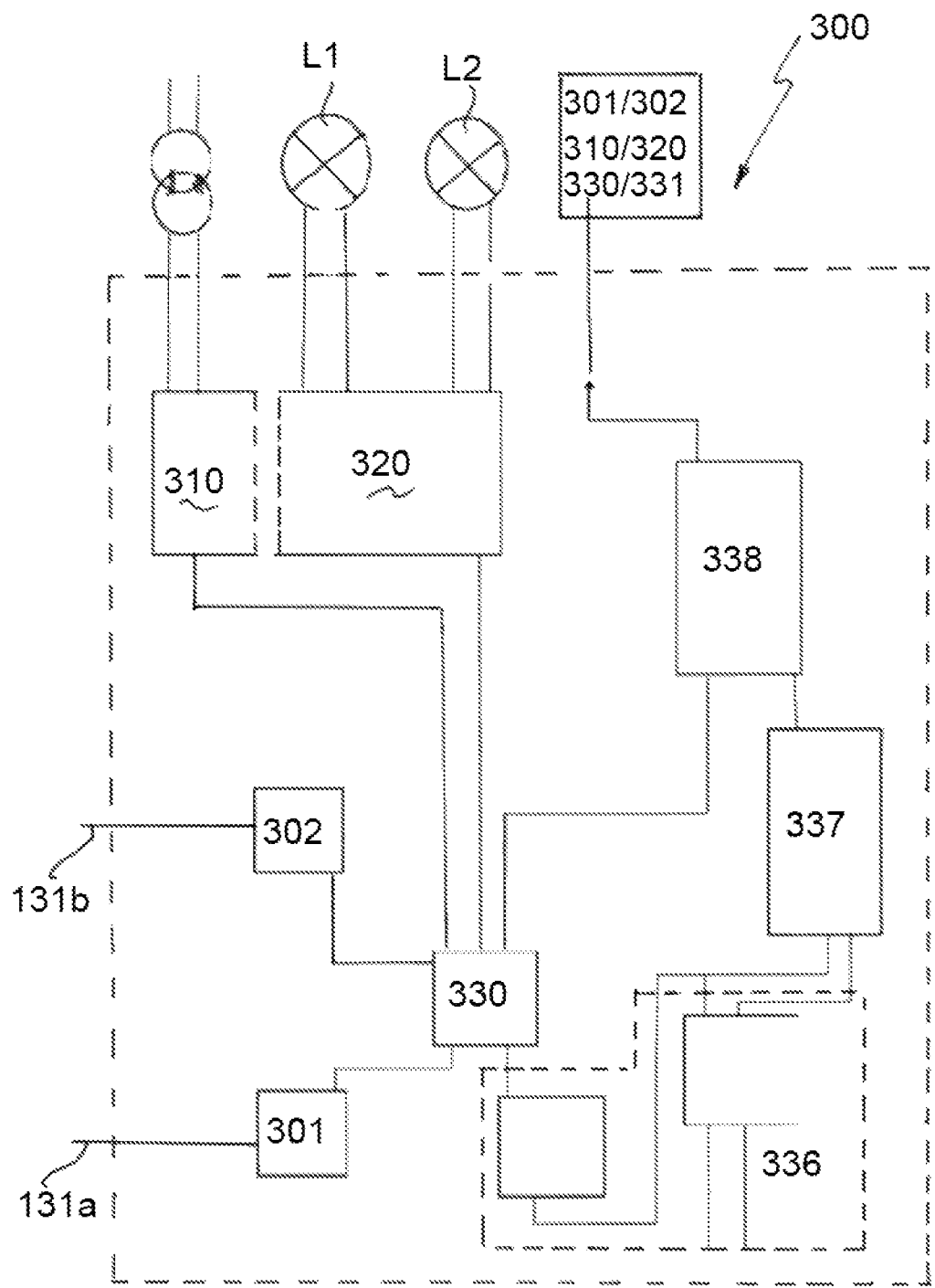
FIG. 3: shows a functional block diagram of the component parts of the control module.
Figure 4:
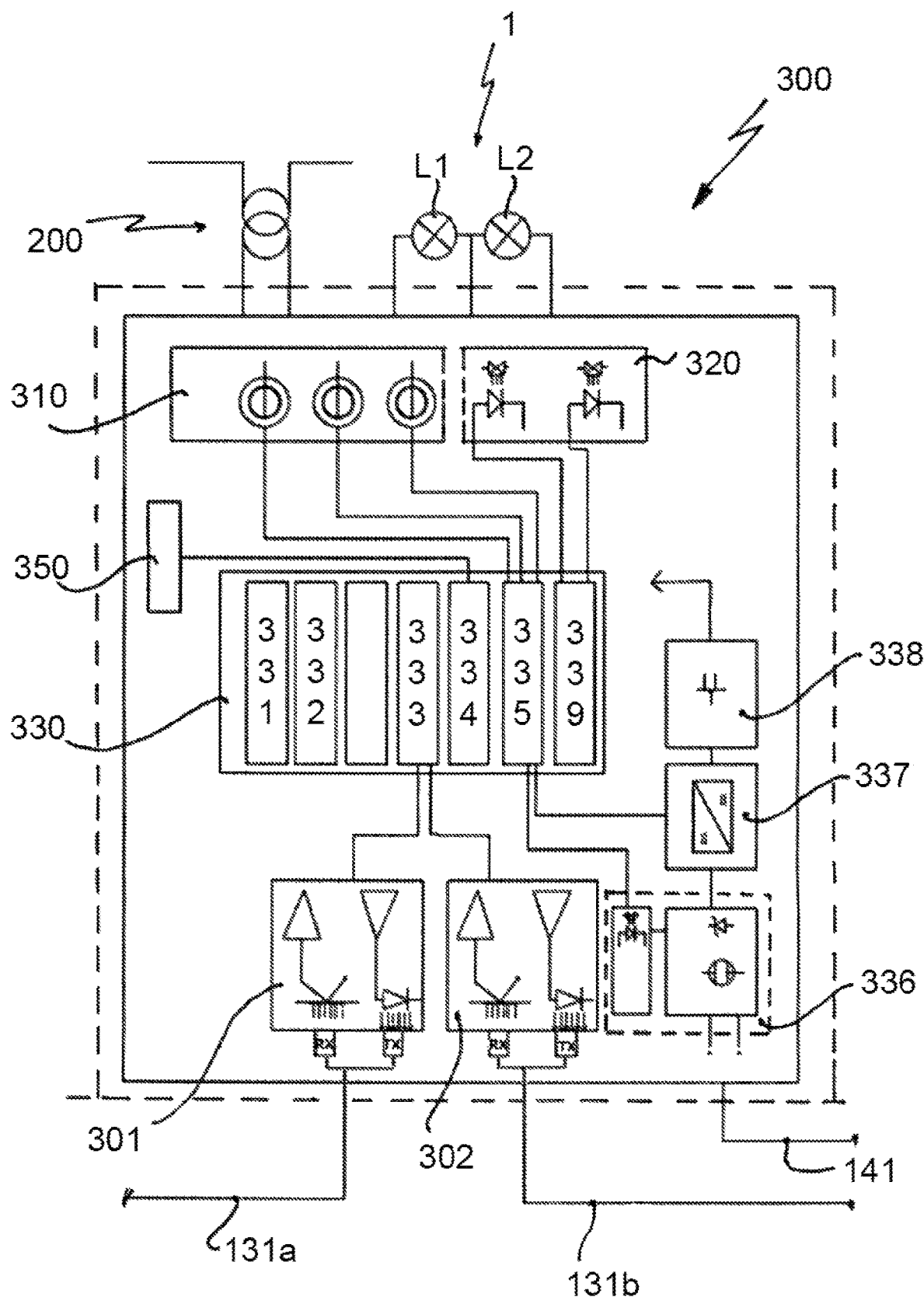
FIG. 4: shows a circuit block diagram of the component parts of the control module.

In detail (FIGS. 3,4) each control module 300 comprises:

at least a first secondary optical/digital conversion device 301 and a second secondary optical/digital conversion device 302, each of which is designed to receive and convert a received input optical signal into a digital signal and, vice versa, convert a received digital signal into an output optical signal to be transmitted;

The first optical/digital converter 301 of each module 300*m* is connected to an optical cable for bidirectional connection to the second optical/digital converter of the adjacent upstream module 300*m*-1 in the series or, in the case of the first control module 300 for controlling the first light 1, to the first optical cable 131*a* for bidirectional connection to the first optical/digital converter 131 of the programming and management unit (100). Each first conversion device 301 therefore provides a respective transmitter-receiver pair for transmitting and receiving optical signals to/from the respective upstream adjacent control module 300 or the first converter 131 of the management and control unit 100.

The second optical/digital converter 302 of each module 300*m* is connected to an optical cable 131*b* which provides a bidirectional connection to the first optical/digital converter of the adjacent downstream control module 300*m*+1 in the series or, in the case of the module 300*n* of the last light 1*n*, to the second optical cable 132*a* for bidirectional connection to the second optical/digital converter 132 of the management and control unit 100. Each second conversion device 302 therefore provides a respective transmitter-receiver pair for transmitting and receiving optical signals to/from the respective adjacent downstream control module 300 or the second converter device 132 of the management and control unit 100.

With this arrangement, the following are configured:

a first bidirectional communication optical channel which connects in series the control modules 300*m* and the first control module 300 of the first light 1 to the management and control unit 100 by means of the first optical cable 131*a*; and a second bidirectional communication optical channel which connects in series the control modules 300*m* and the control module 300*n* of the last light 1*n* to the management and control unit 100 by means of the second optical cable 132*a*.

It will be clear to the person skilled in the art that, in the preferred configuration described, in the first bidirectional communication optical channel, the last downstream control module 300*n* is in turn preferably connected directly to the management and control unit by means of the second optical cable 132*a*, allowing closing of the first series connection channel again on the control unit 100. Similarly, in the second optical communication channel, the first control module 300 of the first upstream light 1 is in turn preferably connected directly to the management and control unit by means of the first optical cable 131*a*, so as to close the second optical communication channel. This has the effect, among other things, of allowing communications to be sent to the control modules and/or the checking cycles of one or more lights/control modules to be carried out in a rapid manner, it not being necessary for the data to travel back along the whole respective optical series connection channel, as will emerge more clearly below.

According to a preferred embodiment, each control module may further comprise:

measurement means 310 for determining the value of the current which flows through the respective transformer 200 and the respective light 1, and/or for eventually interrupting, either one;

means 320 arranged between the secondary winding of the respective transformer and the associated light 1 and designed to switch on/off the latter and, in the case of a light 1 with two or more lamps L1,L2 connected together, designed to short-circuit a lamp which may be faulty, so that the other lamp of the light 1 remains switched on and operative; in a preferred example of embodiment of said switching on/switching off/short-circuiting means 320, it is envisaged that they comprise photo-coupler circuits;

a microprocessor 330 connected to said measurement means 310 and means 320 for switching lights on/off and to said first (301) and second (302) secondary optical/digital conversion means of the respective module 300.

The microprocessor 330 may for example comprise or be associated with:

a memory, for example an EPROM 331, which contains at least a programming firmware and an address lm identifying the control module 300*m* and, if necessary, various operating parameters;

a RAM memory 332 designed to contain volatile data which is used from time to time for calculations of the microprocessor 330;

at least two UART units 333 for processing the signals and the communication protocol which interface with:

a protocol bus 334 for a temperature sensor 350 described below;

a number of analogue inputs 335, depending on the number of lamps L1; L2 actually arranged on the track in the region of the light 1; for example five analogue inputs for the example of a double-lamp light, only three inputs in the case of a single-lamp light; the inputs 335 receive the analogue signals from control circuits which may be present in the module 300;

in the case of the double-lamp configuration, two digital output circuits 339 designed to drive:

the two photo-coupler circuits 320 (or alternative switching on/switching off means) arranged between the microprocessor 330 and each lamp and designed to keep functional at least one of the lamps of the light.

Preferably, the control module 300 also comprises:

a DC sense optical isolated circuit 336, i.e. a galvanically isolated optical circuit for measuring the value of the voltage supplied to the input of the module 300 via the secondary power supply conductors 141; and/or a DC-DC converter isolated circuit 337 for measuring the value of the operating voltage (e.g. 5 V dc) of the module 300.

Preferably the measurement means 310 are of the hall sensor type.

In a preferred embodiment the module 300 also comprises a sensor 350 for detecting the internal temperature of the module 300; with this detection operation the microprocessor 330 may detect data relating to the operation of the module 320 which increases the temperature when a lamp fuses or switches off; a double check as to operation of the light is therefore obtained by means of the sensor 310 which detects the presence/absence of current passing through a lamp and by means of the sensor 350 which detects the increase in temperature due to the operation of the module 320.

With this configuration and with reference now to FIGS. 5a-5d, an example of operation of the installation is as follows:

In normal operating conditions of all the installation components, the remote management unit 100 may equally well send or receive a data packet, or a data packet stream, to/from a given module 300m on the first (C1) or second (C2) bidirectional communication optical channel; the data packet will be for example transmitted from the first optical/digital device 131 along the first optical cable 131a to the first control module 300, and forwarded from the latter on the following bidirectional optical connection 131b to the next control module, until the destination module 300m is reached;

any data response packet generated by the destination module 300m may be transmitted on the first channel C1 back upstream and towards the preceding modules 300 as far as the first module 300 and from these on the first optical cable 131a to the first optical/digital converter device 100 of the management unit 100; in the preferred embodiment shown (FIGS. 1, 5a) it may also be sent downstream on the same first channel C1 to the following control modules 300m+1, until it reaches the last module 300n and from there the second optical/digital converter 132 of the unit 100 by means of the respective bidirectional optical connection cable 132a. In this latter case, it is clear that the transmission of the packet to the management unit 100 may be speeded up if the destination module 300m is arranged towards the end of the first channel C1 in the series of control modules 300 which are optically connected (experimental tests have shown that, in an installation comprising one hundred modules/lights, the time needed for interrogation of the state of a module 300 and the subsequent reception and processing of the response received is within the range of about 200 ms). Moreover, with the preferred configuration, it is also possible to use the second channel C2 to send a different data packet, for example a packet addressed to another module 300 or a packet containing a different query (below also called "request"), which sending/receiving may occur in parallel or in any case before a response is received to the query sent on the first channel C1.

The data packet may for example comprise a command or signal for switching on/switching off or changing the address lm of a module, and/or a query, for example in the form of a request for checking the state of one or more lamps L1 of a light 1, and/or a request for checking the state of the control module 300.

During reception, one or more data packets may contain information about the state of one or more lamps (fused/operational) and about the energized state of the lamp such as a measurement of the current in the secondary power supply circuit of the lamps connected to the module and/or information about the state of a control module, etc. Other examples of information which may be advantageously requested with a query and included in a data packet sent from the module 300 to the management unit 100 include: the address lm of the single module; the detected temperature of the module; the power supply voltage of the module and/or the processor; the firmware version of the control module.

With the installation according to the invention, it is possible to achieve higher reliability and better capacity to withstand faults and malfunctions; in fact, it is able to ensure advantageously that the operability may be maintained in the case of various types of fault.

In the event of breakage of the bidirectional optical connection 131b between two adjacent control modules 300, 300m (FIG. 5b), the communication between the management unit 100 and the control modules 300 arranged upstream of the faulty optical connection 131b may take place on the first bidirectional communication optical channel C1, via the first optical cable 131a, the first control module 300 and the following optical connections between control modules 300; in the case of the control modules 300m, 300n−1, 300n arranged downstream of the faulty optical connection 131b, the communication with the management unit 100 may take place on the second bidirectional communication optical channel C2, via the second optical cable 132a, the last control module 300n situated downstream and the preceding optical connections 131n,131m between adjacent control modules 300n, 300n−1, 300m. In this situation, the installation therefore continues to function without any problem as regards control both of the lights 1 and of the control modules 300, it also being possible to identify easily and rapidly that the fault relates to a precise optical connection. A similar situation arises in the event of breakage of either one of the optical connection cables 131a,132a which are directly connected to the management unit 100.

In the event of breakage of or no response from a control module 300m+1 of a light 1m+1 (FIG. 5c) the communication between the management unit 100 and the control modules 300 arranged upstream of the faulty control module 300m+1 may take place on the first bidirectional communication optical channel C1, via the first optical cable 131a, the first control module 300 and the following optical connections between control modules 300; in the case of the control modules 300n−1, 300n arranged downstream of the faulty control module 300m+1, the communication with the management unit 100 may take place on the second bidirectional communication optical channel C2, via the second optical cable 132a, the last downstream control module 300n and the preceding optical connections 131n,131m between adjacent control modules 300n, 300n−1, 300m. In this situation, the management unit 100 may rapidly detect that the fault relates to a control module 300 and identify with precision which module is not functioning correctly so as to carry out repair thereof. In addition, the operability of the remaining lights, which are controlled by the other control modules 300, will not be penalized in any way.

Figure 5A:
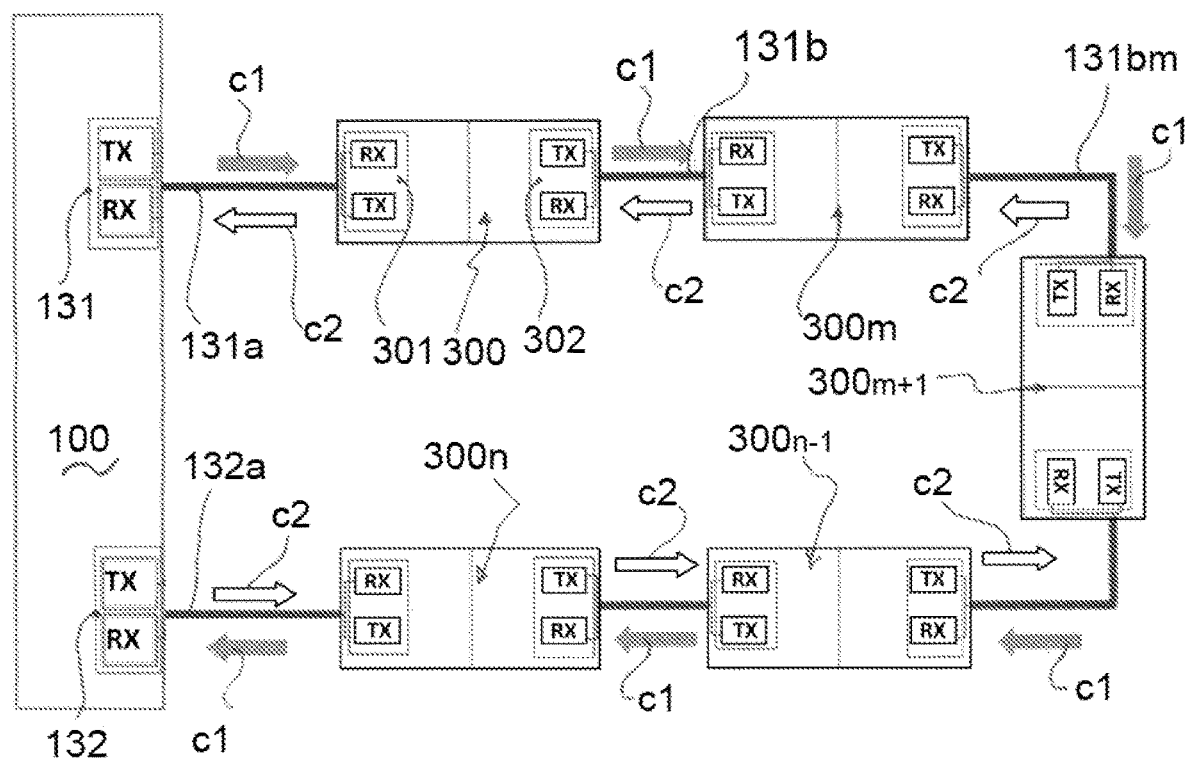
FIG. 5a: shows a diagram of a preferred mode of operation of an example of embodiment of an installation according to the invention.
Figure 5B:
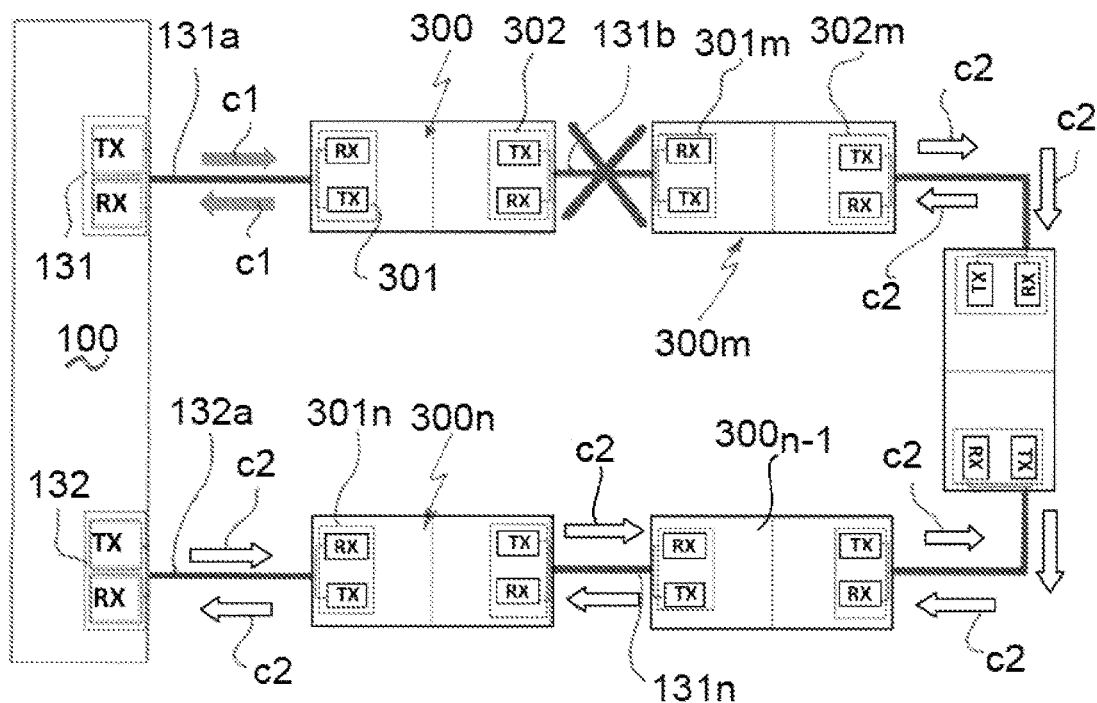
FIGS. 5b-5d: show diagrams of preferred modes of operation of an example of embodiment of the installation according to the invention, in response to different types of fault.
Figure 5C:
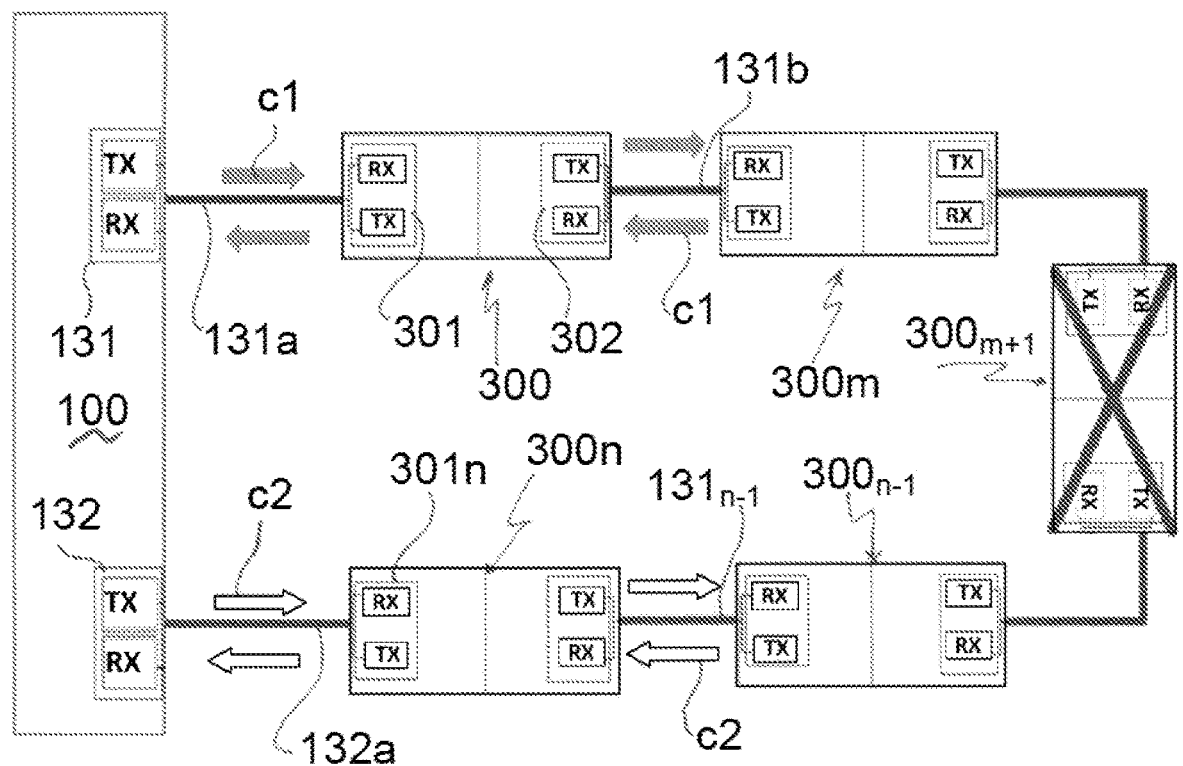
Figure 5D:
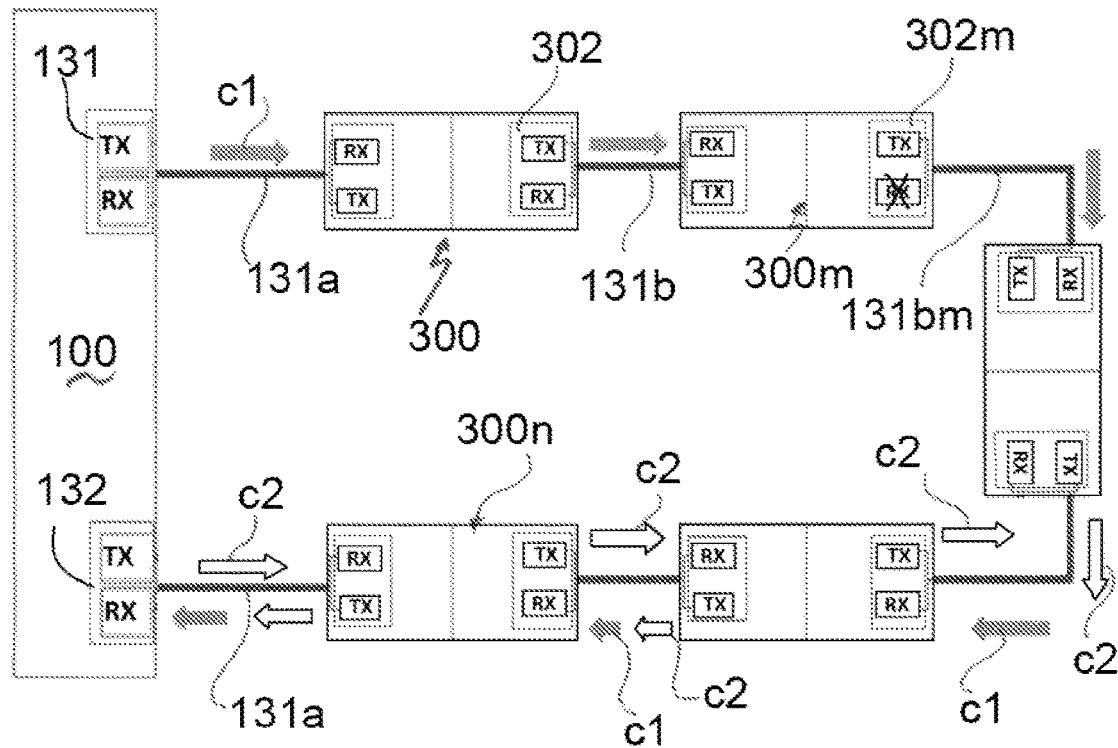
Figure 6:
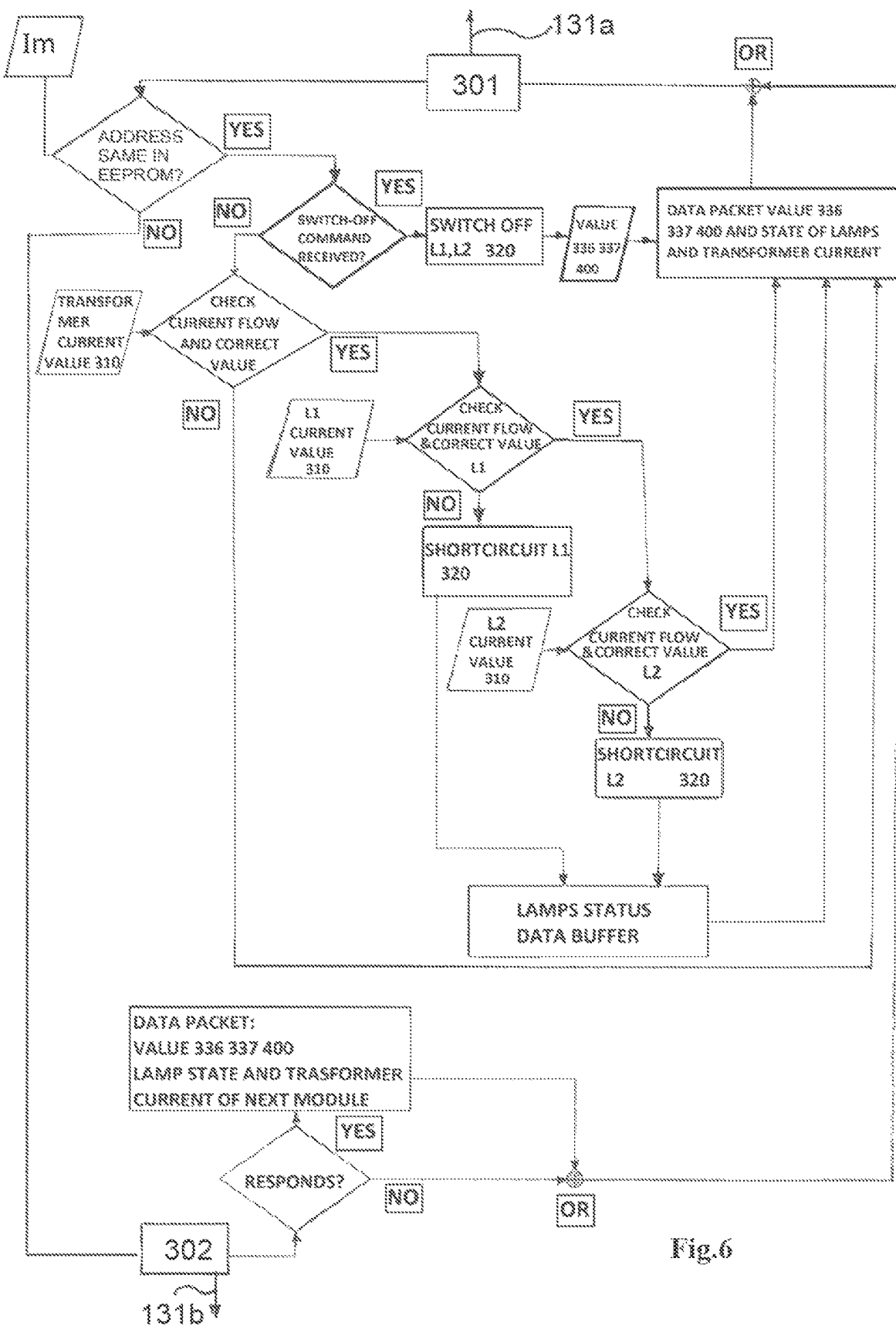
FIG. 6: shows a flow diagram of a method according to the invention for checking and/or controlling switching on and switching off of the lights by means of the installation according to FIG. 1.

FIG. 5d illustrates a further example of a malfunction, which in this case relates to the partial breakdown of the second optical/digital converter device 302 (transmitter/receiver) of the control module 300m, which is no longer able to receive data from the next downstream module 300n−1 on the connection 131bm. This fault may be for example managed as shown in FIG. 5c for the breakage of a connection 131b or, with the preferred configuration described of the two channels C1,C2, by maintaining the full functionality of the first channel C1 in the transmission direction from upstream M to downstream V, with return to the management unit 110 by means of the last module 300n and the second optical cable 132a. The second channel C2 may instead be used in both directions, but only as far as the adjacent module 300n−1 downstream of the module 300m affected by the fault. With reference to FIG. 6, a preferred example of a cycle for controlling and/or checking the state of one or more lights 1 performed by means of an installation according to the present invention will now be described; first of all the following are identified:

each module 300 with an address $l_1, \ldots, l_m, \ldots, l_{m+1}, \ldots, l_n$ able to define the position thereof along the series circuit;

any lamps of each light 1*m*, which are arranged in series (two in the example), indicated by L1,L2

At the start of the control cycle, which is for example performed on the first optical communication channel C1 starting preferably from the first module 300:

the management unit 100 sends, via the cabin computer 110, the primary converter 131 and the first optical cable 131*a*, a request to check the state of a light 1*m* corresponding to an assigned address lm of the module 300*m*;

the request is received by the first optical/digital converter 310 of the module 300, converted into digital form and forwarded to the microprocessor 330;

it is checked whether the incoming address lm is the same as the address of the module 300*m* stored in the corresponding EPROM 331;

if NO, the check request lm is forwarded to the second optical converter 302 of the module 300*m* and transmitted downstream on the optical cable 131*b* to the next module until a module 300*m* is reached where the address corresponds to the address lm of the request;

if YES (=address lm correct):

checking by the module 300*m* as to whether a light switching on/off signal sent from the cabin computer 120 has been received and, if so, switching on/switching off of the light 1*m*; said switching on/off signal being a priority signal for example in the case of control lights (stop bars) for the movement of an aircraft along a taxiing/take-off runway;

if no light switching off command has been received, the module 300*m*, checks, by means of the sensors of the measurement circuit 310, whether any current is flowing on the secondary winding of the transformer 200*m* and whether it corresponds to the correct pre-set value of the transformer;

if YES (=correct current flowing on the transformer): it is checked by means of the measurement circuit 310 whether there is current with the correct value flowing on the lamp L1 and whether there is current with the correct value flowing on the lamp L2.

if YES, the values of the circuits 336,337,350 are integrated in a data packet and the data packet is forwarded to the first secondary optical converter 301 which transfers the packet to the next adjacent module in the series;

the computer 120 in the cabin 100, if there is no signal indicating a problem with the module 300*m*, sends a check request for the next module 300*m*+1;

the checks described above are repeated and, if the next module 300*m*+1 is correctly functioning, the microprocessor 330*m*+1 integrates the packet of data 336, 337,350 received from the preceding module 300 *m* with the corresponding data of the present module 300*m*+1;

the data packet thus updated is further forwarded to the next module which will receive a corresponding request for operation from the cabin computer 120.

With this sequence, the data packet is updated, following each query, with the values obtained from the modules which are subsequently interrogated, and transmitted to the next module so as to reduce the latency time and speed up the checks of the various modules;

The state check request is repeated for all the modules in the series up to the last module 300*n*, which adds its data to the packet of data corresponding to the operation of all the preceding modules and/or lights and previously received, and sends the complete data packet to the cabin computer 120 via the second cable 132*a*;

the data corresponding to (correct) operation of all the modules and/or lights is recorded in the archive of the computer 120 and at the same time a new check cycle is started and repeated continuously.

If, at the check request lm+1, the module reached is the correct module 300*m*+1 and the following is obtained:

Module operating, but not correctly

NO, to the check of the correct current value on the transformer 200*m*: the following are detected: the voltage value present at the input of the DC sense optical isolated circuit 336 and the value of the operating voltage (5V dc) of the module 300*m* present on the DC-DC converter isolated circuit 337, and a corresponding data packet containing said values is generated and forwarded to the next adjacent module in the series;

Transformer operating: lights?

YES, to the check of the correct value of the current on the transformer, but

NO, to the check of the correct current values on one or more lamps L1,L2 of the light 1*m*+1: the corresponding switching-on/switching-off/short-circuiting drive 320 of the light 1*m* is operated so as to short-circuit the one or more lamps L1,L2 which are not working and the existing values of the currents and the circuits 336,337, 350 are integrated in the data packet and forwarded to the second secondary optical converter 302 which transfers the packet to the following downstream modules 300.

Preferably, the data packet also integrates the value of the voltage present at the input of the DC sense optical isolated circuit 336; the operative voltage value of 5 V dc of the module 300*m* present on the DC-DC converter isolated circuit 337; and the value of the temperature detected by the sensor 350; said values are forwarded to the secondary optical converter 302 which transfers them to the cabin computer 120 via the following downstream modules 300 and the optical cable 132*a* of the secondary optical channel.

Module faulty

If, after a predefined number of requests sent the next module 300*m*+1 does not respond to the new transmitted state request with address lm+1, the preceding module 300*m*, by means of the first secondary optical converter 301 and the preceding upstream modules 300, sends on the first optical channel 131*a* to the cabin computer 100 a data packet with the information that the next module is not responding to its request;

the computer 120 in the cabin 100 starts at this point the state request via the second optical cable 132*a* on the second optical channel C2, proceeding in the opposite direction and carrying out the aforementioned checks, from the last module 300*n* as far as the module 300*m*+2 which, not receiving any response from the module 300*m*+1, will send back again on the second optical channel and via the downstream modules 300*m* and the second optical cable 132*a* a response signal corresponding to the information that the next upstream module 300*m*+1 is not responding, as illustrated above with reference to FIG. 5c; it is thus possible to identify with precision the faulty module 300m+1 and also, on the basis of its address lm+1, the physical position of its well Pm+1 so that maintenance work and replacement of the faulty module may be promptly carried out.

Although described in relation to the presence of two lamps L1,L2 connected in series for each light 1, it is within the technical skill of the person skilled in the art to design the installation, the module 300 and the associated operation for a simplified configuration with only one lamp for each light 1, thus reducing the number of associated circuits for each light 1 and therefore the corresponding data which is no longer needed, or alternatively a configuration with three or more lamps for each light 1.

According to the invention a method for checking signalling lights arranged in series, in particular lights of airport runways by means of an installation according to the present invention described above is further envisaged; the method, for the sake of easier illustration described with reference to the first communication channel C1, comprises the following steps:

a) assigning to each module 300 an address 1, . . . , 1m, . . . 1m+1 . . . , 1n, with 0≤m≤n, able to define its position along the series circuit;
b) identifying the lights 1 and/or the lamps L1 and/or L2 of each light 1 connected to each module 300;
starting of the check cycle by the computer 120 in the cabin 100 with:
c-d) generation and primary conversion from digital to optical of a command and/or a verification request addressed to a module with address lm;
e) sending, on a first optical channel 131a, of the command and/or of the request in optical format to the module 300m;
f) conversion from optical to digital of the request/command received from the module 300;
g) checking the correspondence between the incoming address lm and the address of the module 300 stored inside it; if YES, sending to the cabin computer 120 confirmation of the existence and correspondence of the address;
h) IF NO, forwarding the verification request lm to the next downstream module via the first optical connection channel of the modules 300m+1 until a module 300 whose address corresponds to the request address lm is reached.

Further preferred steps of the method may include one or more of the following:
i) IF YES (address lm correct), checking by the module 300m of any reception of a light switching-off or switching-on signal, sent from the cabin computer 120;
j) IF YES, switching off of the light 1m;
k) IF NO, checking by the module 300m of the current flow on the transformer 200m and verification as to whether the same corresponds to the correct pre-set value of the said transformer;
l) IF YES (=correct current flow on the transformer): verification of the flow and the correct current value on the lamp L1 and/or on the lamp L2;
m) IF YES, integration in a data packet of the current values detected and forwarding of the data packet to the next adjacent downstream module 300m+1;
n) repetition of the steps d-m for each next module 300 in the series, with updating of the data packet received by each control module 300, as far as the last module 300n;
o) sending of the complete data packet to the cabin computer by the last module 300n in the series via the second optical channel;
p) recording of the data corresponding to correct operation of all the modules and/or lights in the archive of the computer 120 and simultaneous start-up of a new check cycle which is repeated continuously.

According to a preferred mode of implementation of the invention:
q) IF YES to verification of correspondence between the request address lm and the control module 300m reached, according to step g), and
r) IF NO to verification of the correct current values on the transformer 200m according to step k), the following steps are carried out:
s) detection of the current voltage value present on the control module 300, integration in a data packet with said current voltage value and forwarding of the data packet to the next adjacent downstream module 300;
t) execution of steps n-p).

According to a preferred mode of implementation of the method:
u) IF YES to verification of the correct current values on the transformer 200m+1, according to step k), but
w) NO to verification of the correct current value on one or more lamps L1,L2 of the light 1m, according to step l), execution of the following steps:
x) short-circuiting of the one or more non-operational lamps L1,L2, updating of the data packet with the values of the existing currents detected and transfer of the data packet to the next adjacent downstream module (300);
y) execution of steps n-p).

According to a preferred mode of implementation:
z) IF, after a predefined number of requests sent according to step m), the next module 300m+1 does not respond to the transmitted state request with address lm+1, execution of the following steps:
aa) transmission to the cabin computer 120 along the first optical channel, by the preceding module 300m, of the information that the next module does not respond to its address;
bb) generation of a new state request with address lm and sending thereof to the last module 300n of the series via the second optical channel 132a; cc) forwarding of the next state requests, proceeding in the reverse direction along the second channel C2 and carrying out of the checks according to the preceding steps, from the last module 300n as far as the module 300m+2 preceding the module 300m+1 which did not respond; dd) if there is no response from the module 300m+1, the last operational module 300m+1 sends an associated response signal corresponding to the information that the next upstream module 300m+1 is not responding, transmitting on the second channel C2 via the modules 300m+3 and next downstream modules as far as the last module 300n in the series;
ee) sending, by the last module 300n, of the information via the second optical cable 132a to the management unit 100.

In this way the faulty module and, based on the its address lm+1, also the physical position of its well Pm+1 are precisely identified so that the maintenance work and replacement of the module and/or the faulty lights may be promptly carried out.

It is therefore clear how, with the installation and method according to the invention, it is possible to control and/or check reliably and quickly the operating state of lights, in particular airport lights, while identifying with precision and remotely any faulty light without the need for on-site checks. Moreover, owing to the use of separate optical channels, the installation is not affected by a possible low isolation value of the primary circuits, which value does not in any case adversely affect operation. Furthermore, the installation is immune to atmospheric discharges owing to the use of optical cables for the communication channels and the power consumption of the installation is drastically reduced (to about 1 Watt) so that significant energy savings may be achieved.

The invention claimed is:

1. An installation for powering and controlling a plurality of signalling lights (1), arranged in series, each signalling light of the plurality of signalling lights having at least one light source (L1,L2), the installation comprising:
   a management unit (100) for remotely programming/managing operation of the installation, with an upstream (M) primary power supply (110);
   a primary series circuit for powering the plurality of signalling lights, the primary series circuit including a plurality of transformers having a transformer (200) for and an associated signalling light of the plurality of signalling lights, the plurality of transformers being connected in series to the primary power supply;
   a series of control modules (300, 300m, 300n), wherein each control module of the series of control modules is arranged between a respective transformer of the plurality of transformers and the associated signalling light of the plurality of signalling lights;
   a secondary power supply circuit (140) for powering the series of control modules independently of the primary series circuit and of the primary power supply for powering the plurality of signalling lights;
   a first optical cable (131a) for bidirectionally connecting a first upstream control module (300) of the series of control modules to the management unit (100); and
   a second optical cable (132a) for bidirectionally connecting a last downstream control module (300n) of the series of control modules to the management unit (100),
wherein each other control module of the series of control modules is arranged between the first upstream control module and the last downstream control module and connected in series to an adjacent upstream control module and to an adjacent downstream control module by means of a respective bidirectional optical connection thereby forming
   a first bidirectional communication optical channel (C1) which connects in series at least the management unit, the first upstream control module (300) of a first upstream signalling light and following control modules (300m) of the series of control modules; and
   a second bidirectional communication optical channel (C2) which connects in series the management unit (100), the last downstream control module (300n) of a last downstream signalling light (1n) and preceding upstream control modules (300m) of the series of control modules.

2. The installation according to claim 1, wherein each said control module (300) is identified by means of an address (1, ..., 1m, ... 1m+1 ..., 1n) designed to define its position along the primary series circuit.

3. The installation according to claim 1, wherein the management unit (100) comprises:
   at least a first conversion device (131) and a second (132) conversion device, each of which is designed to receive and convert an input optical signal into a digital signal and, vice versa, convert an input digital signal into an optical signal to be transmitted at its output;
wherein the first conversion device (131) is connected to the first optical cable (131a) for connection to the first control module (300), for receiving/transmitting optical signals from/to the series of control modules (300) of the plurality of signalling lights (1), and the second conversion device (132) is connected to the second optical cable (132a) for connection to the last downstream control module (300n), for receiving/transmitting optical signals from/to the series of control modules (300) of the plurality of signalling lights (1).

4. The installation according to claim 1, wherein said each control module (300) comprises:
   at least a first optical/digital conversion device (301) and a second (302) optical/digital conversion device, each of which is designed to receive and convert an input optical signal into an output digital signal and, vice versa, convert an input digital signal into an output optical signal to be transmitted,
      wherein the first optical/digital conversion device (301) is connected to a respective bidirectional optical cable connected to the second optical/digital conversion device of the adjacent upstream control module (300m-1) in the series of control modules or, in the case of the first upstream control module (300) of the first upstream signalling light (1), to the first optical cable (131a) for bidirectional connection to the management unit (100), and
      wherein the second optical/digital conversion device (302) is connected to an optical cable connected to the first optical/digital conversion device of the adjacent downstream control module (300m+1) in the series of control modules or, in the case of the last downstream control module (300n) of the last downstream signalling light (1n), to the second optical cable (132a) for bidirectional connection to the management unit (100).

5. The installation according to claim 1, wherein the first bidirectional communication optical channel also connects back the last downstream control module (300n) to the management unit (100) by means of said second optical cable (132a) for bidirectionally connecting the last downstream control module (300n) of the series of control modules to the management unit (100), and wherein the second bidirectional communication optical channel (C2) also connects back the first upstream control module (300) of the first upstream signalling light (1) to the management unit (100) by means of said first optical cable (131a) for bidirectionally connecting the first upstream control module (300) of the series of control modules to the management unit (100).

6. The installation according to claim 1, wherein said each control module (300) comprises:
   measurement means (310) for determining a value of current which flows across the respective transformer (200) and/or each light source (L1,L2) of a respective signalling light (1) of the plurality of signalling lights and/or any interruption of either one of them; and/or
   switching means (320) for the respective signalling light (1) arranged between a secondary winding (201b) of the respective transformer (200) and the respective signalling light (1), said switching means being also able to short-circuit any damaged light source of the signalling lights (1,L1,L2); and/or
   a microprocessor (330).

7. The installation according to claim 1, wherein said each control module (300) comprises an optical circuit (336) which is galvanically isolated and designed to measure a value of voltage supplied to an input of the control module (300) via the secondary power supply circuit (140).

8. The installation according to claim 1, wherein each said control module (300) comprises a DC-DC converter isolated circuit (337) for measuring a value of operating voltage of the control module (300).

9. The installation according to claim 1, wherein said each control module (300) comprises a sensor (350) for detecting an internal temperature of the control module (300).

10. The installation according to claim 6, wherein said switching means (320) are photo-couplers.

11. The installation according to claim 1, wherein said management unit (100) comprises:
- a constant current regulator for generating and supplying said upstream (M) primary power supply (110), for supplying a switch-on current/voltage to the primary series circuit for powering the plurality of signalling lights (1) via a power supply branch (110a) for primary windings (201a) of the plurality of transformers (200) and a return branch (110b) for closing the primary series circuit;
- a cabin processor (120) comprising memory devices and a CPU for programming and managing the operation and remote control of the installation.

12. A lighting assembly comprising the installation according to claim 1, and a plurality of signalling lights (1) arranged in series.

13. A method for controlling a state of and/or switching on/switching off the plurality of signalling lights by means of the installation according to claim 1, the method comprising:
- a) assigning to each said control module 300 an address (1m) able to define its position along the series circuit;
- b) identifying the plurality of signalling lights (1) and/or the at least one light source of each said signalling light (1) connected to each said control module (300);
- c) generating a command and/or a request addressed to a respective control module (300m) of the series of control modules with address (1m) by means of the management unit (100);
- d) converting from digital to optical the command and/or request addressed to the respective control module (300m) with address (1m) by means of the management unit (100);
- e) sending, on the first bidirectional communication optical channel (C1) or the second bidirectional communication optical channel (C2), the command and/or request in optical format addressed to the respective control module 300m;
- f) receiving and converting from optical to digital the command and/or request received by the first upstream control module (300) or by the last downstream control module (300n) present on the first bidirectional communication optical channel (C1) or the second bidirectional communication optical channel (C2);
- g) checking a correspondence between the address (1m) of the command and/or request and the address of the respective control module (300m) stored inside the respective control module; if YES to the correspondence between the address (1m) of the command and/or request and the address of the respective control module, sending to the management unit (100) confirmation of existence and the correspondence of the respective control module with address (1m);
- h) if NO to the correspondence between the address (1m) of the command and/or request and the address of the respective control module, forwarding the command and/or request (1m) addressed to the respective control module (300m) with address (1m) to the adjacent downstream control module or the adjacent upstream control module via the first bidirectional communication optical channel (C1) or the second bidirectional communication optical channel (C2) of the series of control modules (300) until the respective control module (300m) whose address corresponds to the address (1m) of the command and/or request is reached.

14. The method Method-according to claim 13, wherein:
- i) IF YES to the correspondence check according to step g) between the address (1m) of the command and/or request and the address of the respective control module (300m) reached, checking by the respective control module (300m) of any reception of a light switching-off/switching-on signal, sent from the management unit (100);
- j) IF YES to the check of any reception according to step i), switching off/switching on of the associated signalling light (1m);
- k) IF NO to the check of any reception according to step i), checking by the respective control module (300m) of current flow on the respective transformer (200m) and verification as to whether the same corresponds to a correct pre-set value of the respective transformer;
- l) IF YES to the check of the correct pre-set value, verifying the current flow and correct current value on said at least one light source (L1; L2) of the associated signalling light (1m);
- m) IF YES to the check of current flow and the correct current value on said at least one light source, integrating detected current values in a data packet and forwarding the data packet to a next adjacent downstream control module (300m+1) of the series of control modules or the adjacent upstream control module along the first bidirectional communication optical channel (C1) or second bidirectional communication optical channel (C2).

15. The method according to claim 14, further comprising one or more of the following steps:
- n) repetition of the steps d-m for each next control module (300) in the series of control modules, with updating of the data packet received by said each control module (300), as far as a last module (300n) in the series of control modules;
- o) sending the data packet to the management unit (100) by the last module (300n) in the series of control modules via the second bidirectional communication optical channel;
- p) recording data corresponding to correct operation of all control modules in the series of the control modules and/or all signalling lights of the plurality of signalling lights in the management unit (100) and optionally start-up of a new verification cycle which is repeated continuously.

16. The method according to claim 15, further comprising:
- q) IF YES to checking correspondence between the request and/or command address (1m) and the address of the respective control module (300m) reached, according to step g), and
- r) IF NO to verification of the correct current value on the transformer (200m) according to step k), the following steps are carried out:
- s) detecting a current voltage value present on the respective control module (300), integrating a data packet with said current voltage value and forwarding the data packet to the adjacent downstream control module (300) or the preceding upstream control module along the first bidirectional communication optical channel (C1) or the second bidirectional communication optical channel (C2);
- t) execution of steps n-p).

17. The method according to claim 15, further comprising:
- u) IF YES to verification of the correct current value on the respective transformer (200$m$+1), according to step k), but
- v) NO to verification of the correct current value on said at least one light source (L1,L2) of the associated signalling light (1$m$), according to step l), executing the following steps:
  - w) short-circuiting of one or more non-operational light sources (L1,L2), updating the data packet with values of the existing currents detected and transfer of the data packet to the next adjacent downstream control module or the preceding upstream control module (300) along the first bidirectional communication optical channel (C1) or second bidirectional communication optical channel (C2);
  - x) execution of steps n-p).

18. The method according to claim 13, further comprising:
- y) IF, after a predefined number of commands/requests sent according to step h) or step m), a next control module (300$m$; 300$m$+1) does not respond to the transmitted command and/or request with address (1$m$; 1$m$+1), executing the following steps:
- z) transmitting to the management unit (100) along the said first bidirectional communication optical channel or second bidirectional communication optical channel, by a preceding control module (300$m$), of information that the next control module does not respond to its address;
- aa) generating a new command and/or request with a same address (1$m$; 1$m$+1);
- bb) sending the new command and/or request to the next control module (300$m$; 300$m$+1) addressed via the other second bidirectional communication optical channel or first bidirectional communication optical channel (C2; C1);
- cc) forwarding the new command/request, proceeding in a reverse direction along the other second bidirectional communication optical channel or first bidirectional communication optical channel (C2; C1), from the last downstream control module or first upstream control module (300$n$) as far as a preceding control module (300$m$+2) before the next control module (300$m$+1) which did not respond.

19. The method according to claim 18, further comprising:
- dd) if there is no response from the next control module (330$m$; 300$m$+1) addressed, the preceding control module (300$m$+2) operating along the other second bidirectional communication optical channel or first bidirectional communication optical channel sends an associated response signal corresponding to the information that the next control module (300$m$+1) addressed is not responding, transmitting it along the other second bidirectional communication optical channel or first bidirectional communication optical channel (C2; C1) via further preceding control modules (300$m$+3) as far as the last downstream control module or the first upstream control module (300$n$) in the series of control modules connected by the other second bidirectional communication optical channel or first bidirectional communication optical channel (C2; C1);
- ee) sending by the last downstream control module or the first upstream control module (300$n$) the information to the management unit (100) via the respective second optical cable or the first optical cable (132$a$; 131$a$).

20. The lighting assembly according to claim 12, wherein the plurality of signalling lights (1) are airport signalling lights arranged parallel to taxiing and/or take-off runways and/or airport signalling lights arranged transversely with respect to the taxiing and/or take-off runways.

* * * * *